H. C. CLAY.
TRANSMISSION GEARING FOR TRACTION ENGINES.
APPLICATION FILED JUNE 11, 1912.
1,066,997.
Patented July 8, 1913.
2 SHEETS—SHEET 1.
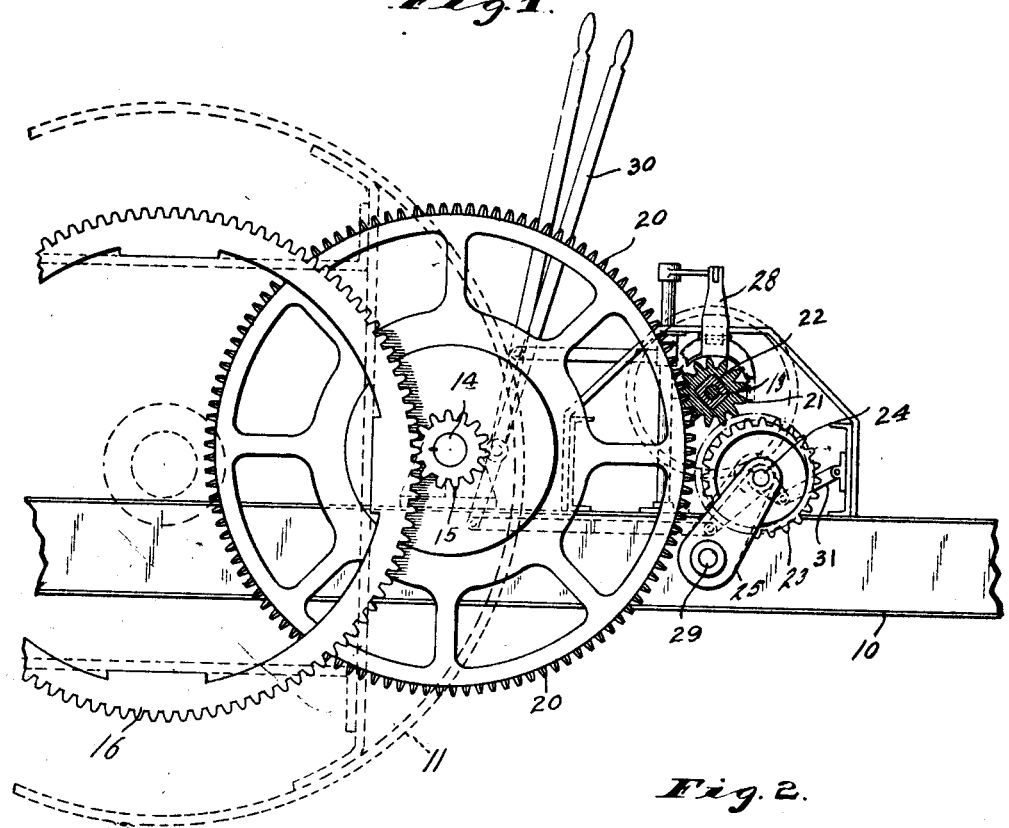
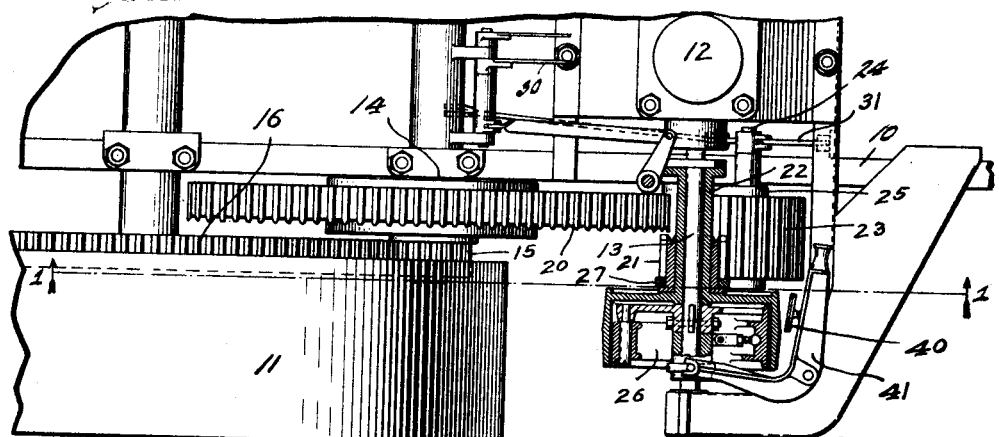

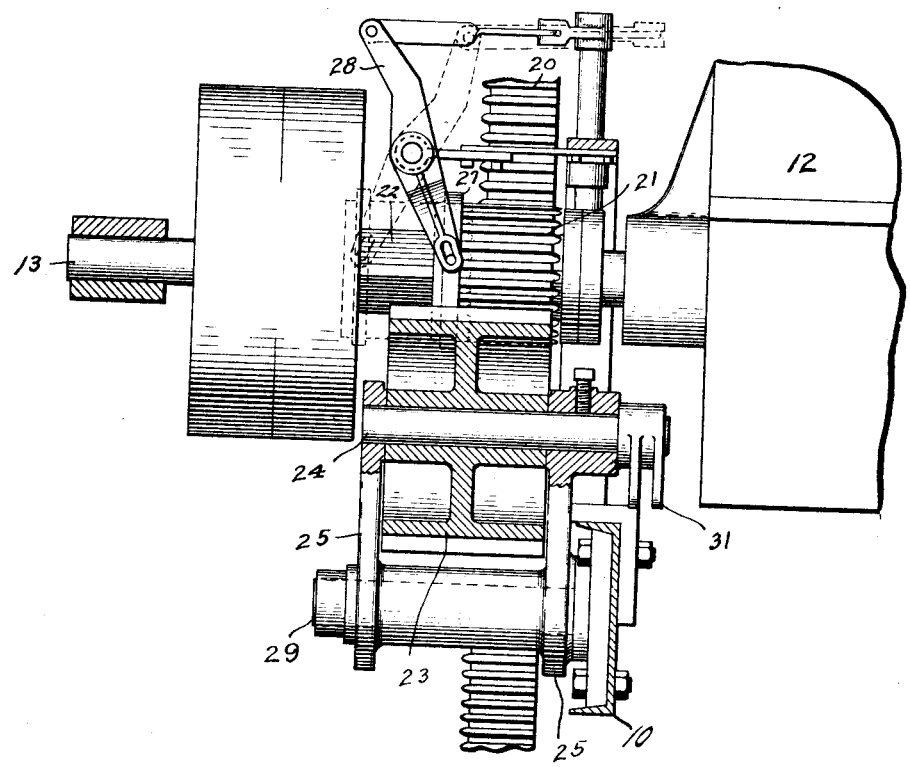

UNITED STATES PATENT OFFICE.

HARRY C. CLAY, OF COLUMBUS, INDIANA, ASSIGNOR TO EMERSON-BRANTINGHAM COMPANY, OF ROCKFORD, ILLINOIS, A CORPORATION OF ILLINOIS.

TRANSMISSION-GEARING FOR TRACTION-ENGINES.

1,066,997. Specification of Letters Patent. Patented July 8, 1913.

Application filed June 11, 1912. Serial No. 703,061.

*To all whom it may concern:*

Be it known that I, HARRY C. CLAY, a citizen of the United States, residing at Columbus, in the county of Bartholomew and State of Indiana, have invented a new and useful Transmission-Gearing for Traction-Engines, of which the following is a specification.

It is the object of this invention to provide a transmission and reversing gearing particularly for use in traction engines, which is at once simple and inexpensive, which is safe-guarded against improper operation, and which is always capable of proper operation. To this end I have provided a driving gear and a driven gear, one of which is movable axially into and out of mesh with the other, and a third gear which may be moved transversely of its axis into mesh with the first two gears only when the latter are not in mesh with each other, the third gear being mounted so that it begins to mesh with the driving gear before it begins to mesh with the driven gear, but gets into full meshing engagement with said two gears at substantially the same time.

In the accompanying drawings, which illustrate my invention, Figure 1 is a side elevation, partly in section on the line 1—1 of Fig. 2, of my improved transmission and reversing gear mounted on a traction engine, only a fragment of the latter being shown; Fig. 2 is a plan view of the gear shown in Fig. 1, some of the parts being in section; and Fig. 3 is a front elevation of the gear shown in Fig. 1, some of the parts being in section.

The tractor frame 10 is provided with the usual rear driving wheels 11, which are driven by an engine 12, the shaft 13 of which is connected by my improved transmission and reversing gearing to a countershaft 14, pinions 15 on which drive gears 16 on the traction wheels. The transmission and reversing gearing comprises a driven gear wheel 20 on the countershaft 14, a driving pinion 21 axially slidable on a square sleeve 22 loose on the shaft 13, and a pinion 23 mounted on a spindle 24 extending between a pair of pivoted arms 25 having a common hub. The sleeve 22 may be connected to the shaft 13 by means of a clutch 26, with the outer surface of which a brake shoe 40 carried by the clutch operating arm 41 may coöperate to hold the pinion 21 from moving when the clutch is open. The pinion 21 is grooved at one end to receive a ring 27, which fits loosely in such groove and coöperates with a yoke 28 whereby the pinion 21 may be shifted axially along the square sleeve 22 into and out of mesh with the gear 20. To facilitate the meshing of the teeth of the pinion 21 and gear 20, such teeth are preferably tapered on their ends which engage first as they are shifted into meshing engagement. The outer diameter of the ring 27 is slightly greater than the outer diameter of the pinion 21, so that when the pinion 21 and gear 20 are in engagement the pinion 23 cannot be shifted into engagement therewith. The ring 27 also prevents the pinion 21 from being shifted into mesh with the gear 20 when they are in mesh with the pinion 23. The pin 29, on which the arms 25 are pivoted, is so located that when the pinion 23 and arms 25 are shifted toward the pinion 21 and gear 20 by the operating handle 30 and the link and lever mechanism 31, the pinion 23 begins to mesh with the pinion 21 before it does with the gear 20, but reaches full meshing engagement with said pinion and gear at substantially the same time. This is done by locating the pin 29 so that the line connecting its axis with that of the spindle 24 forms with the line joining the axis of the pin 29 and that of the gear 20 an angle of which the cosine varies much more rapidly as the arms 25 are moved than does the cosine of the angle between the first of the aforesaid lines and the line joining the axis of the pin 29 and that of the shaft 21; in other words, the first angle is much nearer a right angle than the second.

As a result of this construction, the engine may be operated slowly as the pinion 23 is moved into mesh with its coöperating gears, such rotation first turning the driving pinion 21 slowly on its axis to permit proper meshing between the two pinions 21 and 23, and then turning the latter pinion slowly to permit proper meshing between the pinion 23 and the driven gear 20. Thus all difficulty from the striking of crowns of the teeth of one gear against those of another to prevent meshing is avoided.

I claim as my invention:

1. A transmission and reversing gearing, comprising the combination of a driving gear and a driven gear one of which is movable axially into and out of mesh with the other, a third gear which is movable transversely of its axis into and out of mesh with the first two gears, and means movable with the axially movable gear for preventing the third gear from being moved into mesh with said first two gears when the latter are in engagement with each other.

2. A transmission and reversing gearing, comprising the combination of a driving gear and a driven gear one of which is movable axially into and out of mesh with the other, a third gear which is movable transversely of its axis into and out of mesh with the first two gears, and means movable with the axially movable gear for preventing the third gear from being moved into mesh with said first two gears when the latter are in engagement with each other, and for preventing said first two gears from being moved into mesh with each other when they are in mesh with the third gear.

3. A transmission and reversing gearing, comprising two gears, one of which is axially movable into and out of mesh with the other, a third gear movable transversely of its axis into and out of mesh with the first two gears, and a ring carried by said axially movable gear for blocking the path of the third gear into mesh with the first two gears when the latter are in mesh with each other.

4. A transmission and reversing gearing, comprising two gears, one of which is axially movable into and out of mesh with the other, a third gear movable transversely of its axis into and out of mesh with the first two gears, and a ring carried by said axially movable gear for blocking the path of the third gear into mesh with the first two gears when the latter are in mesh with each other, and for preventing said first two gears from being moved into mesh with each other when they are in mesh with the third gear.

5. A transmission and reversing gearing, comprising two gears, one of which is axially movable into and out of mesh with the other, a third gear movable transversely of its axis into and out of mesh with the first two gears, and a ring carried by said axially movable gear for engaging the side of said third gear when the latter is in mesh with the first two gears and said first two gears are attempted to be moved into mesh with each other, thus preventing such movement at such time.

In witness whereof, I have hereunto set my hand and seal at Columbus, Indiana, this 31st day of May, A. D. one thousand nine hundred and twelve.

HARRY C. CLAY. [L. S.]

Witnesses:
ARTHUR H. STAHLHUTH,
PERRY KING.